United States Patent
Paz-Pujalt et al.

[11] Patent Number: 5,804,342
[45] Date of Patent: Sep. 8, 1998

[54] METHOD OF BAR-CODE PRINTING ON CERAMIC MEMBERS

[75] Inventors: Gustavo R. Paz-Pujalt; Dilip K. Chatterjee; Syamal K. Ghosh, all of Rochester, N.Y.

[73] Assignee: Eastman Kodak Company, Rochester, N.Y.

[21] Appl. No.: 902,417

[22] Filed: Jul. 29, 1997

[51] Int. Cl.[6] .................................................. G03C 5/56
[52] U.S. Cl. .......................... 430/19; 430/346; 430/945; 430/321
[58] Field of Search ........................... 430/19, 346, 321, 430/945; 219/121.66, 121.69, 121.85

[56] References Cited

U.S. PATENT DOCUMENTS

| | | | |
|---|---|---|---|
| 5,290,332 | 3/1994 | Chatterjee et al. | 65/18.1 |
| 5,298,476 | 3/1994 | Hotta et al. | 503/201 |
| 5,336,282 | 8/1994 | Ghosh et al. | 51/319 |
| 5,358,913 | 10/1994 | Chatterjee et al. | 501/103 |
| 5,521,709 | 5/1996 | Bossen et al. | 358/296 |
| 5,543,269 | 8/1996 | Chatterjee et al. | 430/340 |

*Primary Examiner*—John A. McPherson
*Attorney, Agent, or Firm*—Raymond L. Owens

[57] ABSTRACT

A method of making a printing member for providing an erasable bar-code including providing a polymeric substrate having an insert cavity; forming an insert member having a writing surface composed of a non-porous zirconia ceramic $ZrO_2$ that is alloyed with a secondary oxide selected from the group consisting of MgO, CaO, $Y_2O_3$, $Sc_2O_3$, a rare earth oxide, and combinations thereof, the non-porous zirconia alloy ceramic having a density of from about 5.6 to about 6.2 $g/cm^3$; and providing an erasable bar-code image on the printing member by imagewise exposing the printing surface to electromagnetic radiation that transforms the printing surface from a stoichiometric to a substoichiometric state, thereby creating a printing surface having both image areas and non-image areas.

10 Claims, 1 Drawing Sheet ively avoided. Post-exposure baking or blanket exposure to ultraviolet or visible light sources, as are commonly employed, are not required. Imagewise exposure of a bar-code on the printing member can be carried out with a focused laser beam which converts the ceramic surface from a stoichiometric to a substoichiometric state or from a substoichiometric to a stoichiometric state. Exposure with a laser beam enables the printing member to be imaged directly using digital data without the need for intermediate films and conventional time-consuming optical imaging methods. Since no chemical processing, wiping, brushing, baking or treatment of any kind is required, it is feasible to expose the printing member directly with a laser exposing device and suitable means for controlling the position of the laser exposing device.

METHOD OF BAR-CODE PRINTING ON CERAMIC MEMBERS

CROSS REFERENCE TO RELATED APPLICATIONS

The present invention is related to commonly assigned U.S. patent application Ser. No. 08/902,461 filed concurrently herewith, entitled "Erasable Ceramic Bar-Code" to Gustavo R. Paz-Pujalt et al, assigned to the assignee of the present invention. The disclosure of this related application is incorporated herein by reference.

FIELD OF THE INVENTION

This invention relates to encoding bar-code information on ceramic materials.

BACKGROUND OF THE INVENTION

Writing or decorating ceramic surfaces, particularly on zirconia ceramics or oxide ceramics is not easy due to complexities of thermal glazing processes. In such thermal glazing processes, finer details of an image are not normally reproduced on ceramic surfaces. Writing on glass can be accomplished through acid (hydrofluoric) etching. Ceramics are typically decorated through screen printing or hand painting of various features. China and coffee mugs are examples of these technologies. The features imprinted on these objects are then fired at high temperatures to make them permanent and this process is called enameling. There exists a need for reversibly transferring images onto ceramic surfaces.

In commonly assigned U.S. Pat. No. 5,543,269 a method of writing on a ceramic surface is disclosed. The ceramic is formed from zirconia and a dopant. A laser beam is focused on this writing surface to change the color difference of the surface, thereby permitting writing.

In many applications, it is desirable to form a bar-code. In most instances, the bar-code is made permanent and cannot be readily changed.

SUMMARY OF THE INVENTION

It is an object of the present invention to provide a method of making an erasable bar-code printing member.

This object is achieved by a method of making a printing member comprising the steps of:

a) providing a polymeric substrate having an insert cavity;

b) forming an insert member having a writing surface composed of a non-porous zirconia ceramic $ZrO_2$ that is alloyed with a secondary oxide selected from the group consisting of MgO, CaO, $Y_2O_3$, $Sc_2O_3$, a rare earth oxide, and combinations thereof, the non-porous zirconia alloy ceramic having a density of from about 5.6 to about 6.2 $g/cm^3$; and c) providing an erasable bar-code image on the printing member by imagewise exposing the printing surface to electromagnetic radiation that transforms the printing surface from a stoichiometric to a substoichiometric state, thereby creating a printing surface having both image areas and non-image areas.

ADVANTAGES

The printing member of this invention has a number of advantages. Thus, for example, no chemical processing is required so that the effort, expense, and environmental concerns associated with the use of aqueous alkaline developing solutions are avoided. Post-exposure baking or blanket exposure to ultraviolet or visible light sources, as are commonly employed, are not required. Imagewise exposure of a bar-code on the printing member can be carried out with a focused laser beam which converts the ceramic surface from a stoichiometric to a substoichiometric state or from a substoichiometric to a stoichiometric state. Exposure with a laser beam enables the printing member to be imaged directly using digital data without the need for intermediate films and conventional time-consuming optical imaging methods. Since no chemical processing, wiping, brushing, baking or treatment of any kind is required, it is feasible to expose the printing member directly with a laser exposing device and suitable means for controlling the position of the laser exposing device.

The zirconia alloy ceramic utilized in this invention has many characteristics which render it especially beneficial for use in substrate for bar-code printing. Thus, for example, the ceramic surface is extremely durable, abrasion-resistant, and long wearing. Discrimination between substoichiometric image areas and stoichiometric non-image areas is excellent so that image quality on printing is unsurpassed. Its use is fast and easy to carry out, image resolution is very high, and imaging is especially well suited to images that are electronically captured and digitally stored.

Another particular advantage of these substrates for bar-code printing prepared from non-porous zirconia alloy ceramics as described herein is that, unlike conventional printing surfaces, they are erasable and reusable. Thus, for example, after some use, the substoichiometric image areas of the printing surface can be erased from the ceramic printing surface by thermally-activated oxidation or by laser-assisted oxidation. Accordingly, the printing member can be imaged, erased and re-imaged repeatedly.

The present invention is particularly suitable for two dimensional bar-codes which store a large amount of information. Writing onto ceramic materials offers advantages over conventional methods of storing information in that ceramic materials are impervious to the elements and resist high temperatures, humidity, pollutants, and the general conditions associated with weathering.

Bar-codes can be advantageously used to secure information codes in both identification and transaction cards which can use the present invention.

Zirconia alloy ceramics and its composites with alumina are wellknown, commercially available materials which have a multitude of uses. These materials have high strength and high fracture toughness, and are corrosion, wear, and abrasion resistant.

The present invention is particularly suitable for use with identification tags used by soldiers, firemen, and law enforcement officers to aid identification and medical alert bracelets used by patients to alert medical and emergency personnel of existing medical conditions. In addition, identification tags can be used for children, hospital or nursing home patients and handicapped people. Also, cargo containers, freight cars, and other articles can use the present invention.

DETAILED DESCRIPTION OF THE INVENTION

Figure 3:
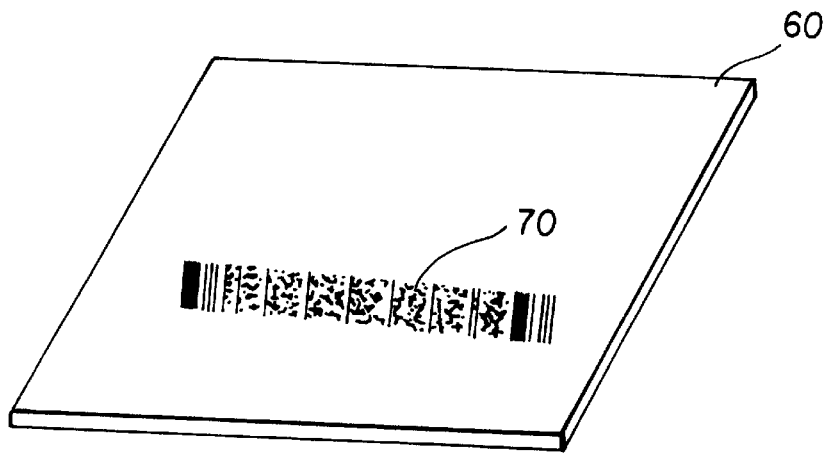
FIG. 3 is a schematic isometric of a two dimensional bar-code on a printing member.

In this invention, zirconia alloy ceramics and its composites were used as printing members for electromagnetic radiation assisted encoding of information in the form of bar-code, which can be interpreted by a scanner. This encoding can be done by laser assisted imaging on the ceramic and its composite. A bar-code is a pattern of bars and lines on which information is encoded. The code is typically scanned by a laser that reads the code into a computer. A number of different codes have been used that are well known in the art. It will be understood that in scanning the bar-code, a low power laser, such as He-Ne, can be used. Such a laser typically has a low power and a low wavelength selected so that will not affect the information previously recorded by a higher power laser which operates at a higher wavelength. The present invention is particularly suitable for use with a two dimensional bar-code. Such two dimensional codes has two axes of recorded bars and lines. Such a two dimensional code is shown in FIG. 3 as two-dimensional bar-code 70. A zirconia alloy ceramic of stoichiometric composition is off-white in color. Transforming it from a stoichiometric composition to a substoichiometric composition changes its color from off white to black. Thus, in one embodiment of this invention, the printing member includes a zirconia alloy ceramic of stoichiometric composition, which was imagewise exposed (infrared irradiation) which converted it to a substoichiometric composition in the exposed regions (image areas), leaving non-exposed (background) as white in color. Although infrared exposure is preferred, it has been determined that other portions of the electromagnetic spectrum can be used to expose the printing member to form bar-codes.

In an alternative embodiment of the invention, the printing member comprises a black zirconia alloy ceramic of substoichiometric composition, and imagewise exposure (usually with visible radiation) converts it to a stoichiometric composition in the exposed regions which is off white in color. In this instance, the exposed regions serve as the background (or non-image areas) and the unexposed regions serve as the image areas.

The off white zirconia alloy ceramic is a stoichiometric oxide, $ZrO_2$, while the black zirconia alloy ceramic is a substoichiometric oxide, $ZrO_{2-x}$. The change from a stoichiometric to a substoichiometric composition is achieved by reduction while the change from a substoichiometric composition to a stoichiometric composition is achieved by oxidation.

In a preferred embodiment of the invention, the printing member is formed of an alloy of zirconium oxide ($ZrO_2$) and a secondary oxide selected from the group consisting of MgO, CaO, $Y_2O_3$, $Sc_2O_3$, rare earth oxides (such as $Ce_2O_3$, $Nd_2O_3$ and $Pr_2O_3$), and combinations or mixtures of any of these secondary oxides. The secondary oxide can also be referred to as a dopant. The preferred dopant is $Y_2O_3$. Thus, a zirconia-yttria alloy ceramic is most preferred.

The molar ratio of secondary oxide (or dopant) to zirconium oxide preferably ranges from about 0.1:99.9 to about 25:75, and is more preferably from about 0.5:99.5 to about 5:95. The dopant is especially beneficial in promoting the transformation of the high temperature stable phase of zirconium oxide (particularly, the tetragonal phase) to the metastable phase at room temperature. It also provides improved properties such as, for example, high strength, and enhanced fracture toughness. The alloys described above have superior resistance to wear, abrasion and corrosion.

The zirconia alloy ceramic utilized in this invention can be effectively converted from a stoichiometric to a substoichiometric state by exposure to infrared radiation at a wavelength of about 1064 nm (or 1.064 $\mu$m). Radiation of this wavelength serves to convert a stoichiometric oxide that is off white in color, to a substoichiometric oxide that is black in color by promoting a reduction reaction. Nd:YAG lasers that emit at 1064 nm is especially preferred for this purpose.

Conversion from a substoichiometric state to a stoichiometric state can be effectively achieved by exposure to visible radiation such as that having a wavelength of 488 nm (or 0.488 $\mu$m). Radiation of this wavelength serves to convert the substoichiometric oxide to the stoichiometric oxide by promoting an oxidation reaction. Argon lasers that emit at 488 nm (0.488 $\mu$m) are especially preferred for this purpose, but carbon dioxide lasers (10600 nm, or 10.6 $\mu$m) radiating in the far-infrared region of the spectrum are also useful. In addition, heating the substoichiometric oxide at from about 150° to about 250° C. can also convert the oxide to a stoichiometric state.

In addition, the zirconia alloy ceramics useful in preparing the printing members of this invention have very little porosity, that is generally less than about 0.1%. The density of the ceramic is generally from about 5.6 to about 6.2 g/cm$^3$, and preferably from about 6.03 to about 6.06 g/cm$^3$ (for the preferred zirconia-yttria ceramic having 3 mol % yttria). Generally, the ceramics have an average grain size of from about 0.1 to about 0.6 $\mu$m, and preferably from about 0.2 to about 0.5 $\mu$m.

Thus, the printing members of this invention have an outer printing surface composed of the noted zirconia alloy ceramic. This outer surface can be highly polished (as described below), or be textured using any conventional texturing method (chemical or mechanical). In addition, glass beads or alumina beads can be incorporated into the ceramic to provide a textured or "matted" printing surface.

The zirconia alloys referred to herein and methods for manufacturing zirconia ceramic articles having very high densities (identified above) using very fine (0.1 to 0.6 $\mu$m average grain size) zirconia alloy powders are described in U.S. Pat. No. 5,290,332 (Chatterjee et al), U.S. Pat. No. 5,336,282 (Ghosh et al) and U.S. Pat. No. 5,358,913 (Chatterjee et al), the disclosures of which are incorporated herein by reference. The basic steps of preparing the printing articles include powder preparation by alloying the zirconia oxide with one or more of the secondary oxides. These powders are then consolidated to a desired shape, preferably having a planar writing surface. The consolidation step can be one of the following, each followed by sintering: a) dry pressing of the powders in a mold, b) cold isostatic pressing followed by machining, c) injection molding followed by debinding, or d) tape casting.

The resolution of laser written images on zirconia alloy ceramic surfaces depends not only on the size of the laser spot but on the density and grain size of the zirconia alloy ceramic. The zirconia ceramics alloy described in the noted patents are especially effective for use in manufacturing printing members because of their very high density and fine grain sizes.

The printing member of this invention can be produced by the use of conventional molding techniques (isostatic, dry pressing, tape casting, or injection molding) and then sintered at high temperatures, such as from about 1200° to about 1600° C. (preferably at about 1500° C.), for a short period of time, such as from 1 to 2 hours. Alternatively, the printing member can be produced by thermal spray coating or vapor deposition of a zirconia alloy on a suitable semi-rigid or rigid base. For use in this invention, the printing surface of the zirconia alloy ceramic can be thermally or mechanically polished or the zirconia alloy ceramic can be used in the "as sintered" or "as coated" form. Preferably, the printing surface is polished to an average roughness of less than about 0.1 µm.

The zirconia in the ceramic utilized in this invention can be of any crystalline form including the tetragonal, monoclinic and cubic forms, or mixtures of any two or more of such phases. The predominantly tetragonal form of zirconia is preferred because of its high fracture toughness. By predominantly is meant a range of 80–100% of the zirconia in the tetragonal crystalline form. Conversion of one form of zirconia to another is well known in the art.

Figure 1:
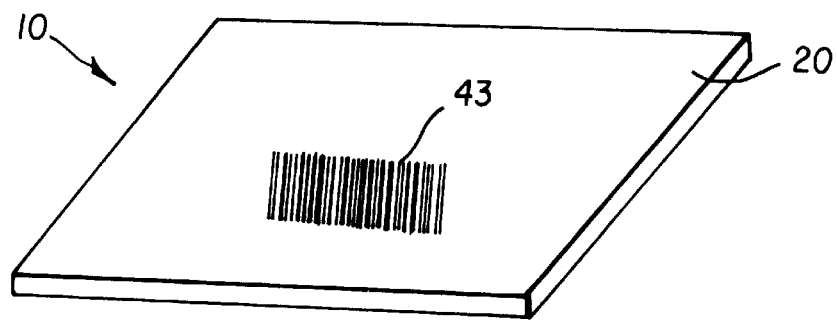
FIG. 1 is a schematic isometric of a ceramic printing member in accordance with the present invention.

In one embodiment of this invention, the printing member is a solid or monolithic printing, preferably in the form of a plate or planar form composed partially or totally of the noted zirconia alloy ceramic or of its composites with alumina. If partially composed of the ceramic, at least the outer printing surface is so composed. A representative printing member 10 is shown in FIG. 1. The planar printing member 10 has an outer planar printing surface. The printing member 10 is composed of a zirconia alloy ceramic or its composites with alumina throughout. The one-dimensional bar-code 43 is written by a laser onto the printing surface 20 of the printing member 10. The one-dimensional bar-code 43 is erasable.

Figure 2:
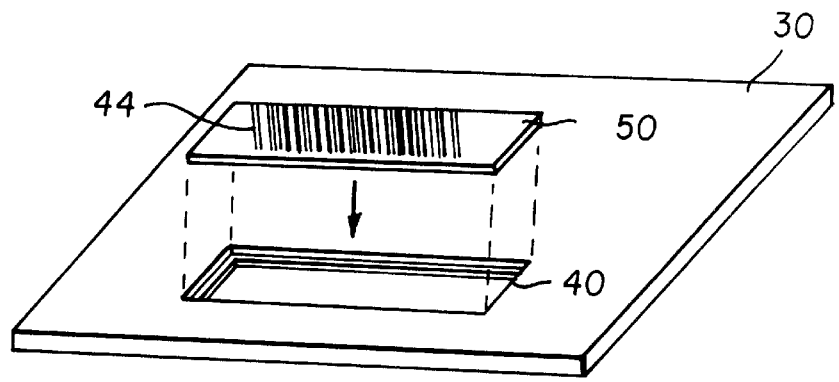
FIG. 2 is a schematic isometric of a printing member which includes a substrate having an insert cavity and a printing member inserted into the cavity in accordance with the present invention.

Turning to FIG. 2 where is shown an identification card which includes a substrate 30. The substrate 30 can be made of numerous different types of materials. In one particular arrangement it is made of polymeric material, which can be injection molded. In any case, the substrate 30 is formed with an insert cavity 40. The insert cavity is selected in size so that an insert member 50 can be press fit or shrink fit into the cavity 40. The top surface of the insert member 50 forms a smooth alignment with the stop surface of the substrate 30. The insert member 50 is a ceramic writable member such has been described above. A one-dimensional bar-code 44 is formed on writing surface of the insert member 50. The one-dimensional bar-code 44 is formed by laser assisted imaging and is erasable. An important feature of the arrangement shown in FIG. 2 is that the insert members can be erased and rewritten and can be readily inserted into the substrate 30. The thermal expansion coefficient of zirconia alloys and its composites vary between $10-12 \times 10^6$ inch/inch/° C. Such high thermal expansion coefficient of these materials makes them suitable candidates for shrink fit in various substrates particularly in polymeric substrates. Therefore, care must be taken in producing the insert printing members 50 so that they will properly fit within the insert cavity 40 of the substrate 30. FIG. 3 shows a planar writing surface 60 on the insert member 50 which has a two-dimensional bar-code 70 which is formed by laser assisted imaging and is erasable.

The printing members of this invention can be imaged by any suitable technique on any suitable equipment. The essential requirement is imagewise exposure to electromagnetic radiation which is effective to convert the stoichiometric zirconia alloy ceramic to a substoichiometric state or to convert the substoichiometric zirconia alloy ceramic to a stoichiometric state. Thus, the members can be imaged by exposure through a transparency or can be exposed from digital information such as by the use of a laser beam. Preferably, the printing members are directly laser written. The laser, equipped with a suitable control system, can be used to "write the image" or to "write the background."

Zirconia alloy ceramics of stoichiometric composition are produced when sintering is carried out in air or an oxygen atmosphere. Zirconia alloy ceramics and its composites with alumina of substoichiometric composition are produced when sintering is carried out in an inert or reducing atmosphere.

Although zirconia alloy ceramics of any crystallographic form or mixtures of the several crystallographic forms can be used as printing, the preferred zirconia alloy ceramic for use in this invention is an alloy of zirconium oxide ($ZrO_2$) and yttrium oxide ($Y_2O_3$) of stoichiometric composition having a molar ratio of yttria to zirconia of from about 0.5:99.5 to about 5.0:95.0. Such alloys are off-white in color. The action of the laser beam transforms the off-white stoichiometric zirconia alloy ceramic to black substoichiometric zirconia alloy ceramic. The imaging of the printing surface is due to photo-assisted reduction while image erasure is due to thermally-assisted reoxidation.

A zirconia-alumina composite ceramic composed predominantly of zirconia of stoichiometric composition is white in color. Transforming the zirconia from a stoichiometric composition to a substoichiometric composition changes the color of the composite ceramic from white to black. Thus, according to the present invention, the planar bar-code printing member can include a zirconiaalumina composite ceramic of stoichiometric composition, and imagewise exposure (with electromagnetic irradiation) converts it to a substoichiometric composition in the exposed regions (image areas), leaving non-exposed (background) areas white in color.

Alternatively, the planar bar-code printing member can include a zirconia-alumina composite ceramic of substoichiometric composition which is black in color, and imagewise exposure (with electromagnetic irradiation, usually with either visible or infrared irradiation) converts it to a stoichiometric composition in the exposed regions which is white in color. In this instance, the exposed regions serve as the background (or non-image areas) and the unexposed regions serve as the image areas.

The white zirconia-alumina composite ceramic thus comprises the stoichiometric oxide, $ZrO_2$, while the black zirconia-alumina composite ceramic comprises a substoichiometric oxide, $ZrO_{2-x}$. The change from a stoichiometric to a substoichiometric composition is achieved by reduction while the change from a substoichiometric composition to a stoichiometric composition is achieved by oxidation.

The printing member is made entirely of, or has at least a printing surface comprised of, a composite (or mixture) of: (1) an alloy of zirconium oxide ($ZrO_2$) and a secondary oxide or dopant (described below), and (2) alumina ($Al_2O_3$). The zirconia alloy comprises from about 50%, by weight, up to about 99.9% of the composite. Thus, the alumina can be present at from about 0.1 to about 50%, by weight. Preferably, the amount of zirconia alloy is from about 70 to about 90%, by weight, and more preferably it is from about 75 to about 85%, by weight, with the remainder being alumina.

The zirconia alloy contains zirconium oxide that is "doped" with a secondary oxide selected from the group consisting of MgO, CaO, $Y_2O_3$, $Sc_2O_3$, rare earth oxides (such as $Ce_2O_3$, $Nd_2O_3$ and $Pr_2O_3$), and combinations or mixtures of any of these secondary oxides. The preferred secondary oxide is $Y_2O_3$. Thus, a yttria doped zirconia-alumina composite ceramic is most preferred.

The molar ratio of secondary oxide (dopant) to zirconium oxide in the alloy preferably ranges from about 0.1:99.9 to about 25:75, and is more preferably from about 0.5:99.5 to about 5:95. The dopant is especially beneficial in promoting the transformation of the high temperature stable phase of zirconia oxide (particularly, the tetragonal phase) to the metastable state at room temperature. It also provides improved properties such as, for example, high strength, and enhanced fracture toughness, and resistance to wear, abrasion and corrosion.

The zirconia utilized in this invention can be of any crystalline form or phase including the tetragonal, monoclinic and cubic forms, or mixtures of two or more of such phases. The predominantly tetragonal form of zirconia is preferred because of its high fracture toughness, especially when the zirconia alloy comprises about 80% or more of the composite. By "predominantly" is meant from about 80 to 100% of the zirconia is of the tetragonal crystalline form. Methods for converting one form of zirconia to another are well known in the art. See, for example, commonly assigned U.S. Pat. No. 5,290,332, the disclosure of which is incorporated by reference herein.

The alumina in the composite is in the rhombhedral form or phase (this may be indexed as hexagonal by a crystallographer), and is known as α-alumina.

Thus, a preferred composite comprises predominantly tetragonal zirconia doped with a secondary oxide (as noted above), in admixture with predominantly α-alumina. Most preferably, this composite would comprise from about 80 to about 99.9% by weight of an alloy comprising 100% tetragonal zirconia doped with up to 3% (based on zirconium oxide weight) of yttria, in admixture from about 0.1 to about 20% (by weight) of 100% α-alumina.

The composites have greater wearability and higher strength and fracture resistance (or toughness) over other ceramic printing members, including those having printing surface prepared solely from zirconia or zirconia-secondary oxide alloys as described above.

A further advantage of the printing members of this invention is that the zirconia-alumina composite is lighter (less dense) than the zirconia alloys described in prior applications because of the lower density of the alumina included therein. Moreover, the alumina has a lower surface energy and melting point so that image discrimination is better, and imaging can be carried out at lower temperatures. Still further, because the ceramic contains alumina, porosity is more readily controlled during manufacture.

Another advantage of the printing members prepared from zirconia-alumina composite ceramics is that image areas of the printing surface can be erased by thermally-activated oxidation or by laser-assisted oxidation as described earlier for zirconia alloy. Accordingly, the printing member can be imaged, erased and re-imaged repeatedly.

The zirconia-alumina composite ceramic utilized in this invention can be effectively converted from a stoichiometric to a substoichiometric state by exposure to infrared radiation at a wavelength of about 1064 nm (or 1.064 μm). Radiation of this wavelength serves to convert a stoichiometric zirconium oxide that is white in color, to a substoichiometric zirconium oxide that is black in color by promoting a reduction reaction. The use for this purpose of Nd:YAG lasers that emit at 1064 nm is especially preferred.

Conversion from substoichiometric to a stoichiometric state can be effectively achieved by exposure to visible radiation with a wavelength of 488 nm (or 0.488 μm). Radiation of this wavelength serves to convert the substoichiometric zirconium oxide to the stoichiometric zirconium oxide by promoting an oxidation reaction. Argon lasers that emit at 488 nm are especially preferred for this purpose, but carbon dioxide lasers irradiating in the infrared (such as 10600 nm or 10.6 μm) are also useful.

While heating substoichiometric zirconia or zirconia alloys at from about 150° to about 250° C. can also convert the zirconium oxide to a stoichiometric state, the zirconium oxide of the zirconia-alumina composites described herein can be similarly converted at a higher temperature, for example from about 300° to about 500° C.

Ceramic printing members can be of any useful size and shape (for example, square or rectangular), and can be composed of the zirconia-alumina composite throughout (monolithic), or have a layer of the composite ceramic disposed in a suitable metal or polymeric substrate (with one or more optional intermediate layers). Such printing members can be prepared using known methods including molding alloy powders into the desired shape (for example, isostatic, dry pressing or injection molding) and then sintering at suitable high temperatures, such as from about 1200° to about 1600° C. for a suitable time (1 to 3 hours). Alternatively, they can be prepared by thermal spray coating or vapor deposition of a zirconia-alumina mixture in a suitable semirigid or rigid substrate.

For imaging the zirconia alloy ceramic printing surface, it is preferred to utilize a high-intensity laser beam with a power density at the printing surface of from about $30 \times 10^6$ W/cm² to about $850 \times 10^6$ W/cm² and more preferably from about $75 \times 10^6$ to $425 \times 10^6$ W/cm².

An especially preferred laser for use in imaging the planar printing member of this invention is a Nd:YAG laser that is Q-switched and optically pumped with a krypton arc lamp. The wavelength of such a laser is 1.06 μm.

Imaging can be accomplished in two ways: "ablation" whereby exposed portions of the printing surface are loosened, removed or vaporized, and "melting" whereby the zirconia in the exposed portions of the printing surface are melted and not ablated.

For use in the stoichiometric to stoichiometric conversion process by means of ablation, the following parameters are characteristic of a laser system that is especially useful.

Laser Power: Continuous wave (average)—0.1 to 50 watts
   preferably from 0.5 to 30 watts
   Peak power (Q-switched)—6,000 to 100,000 watts
   preferably from 6,000 to 70,000 watts
   Power density—$30 \times 10^6$ W/cm² to $850 \times 10^6$ W/cm²
   preferably from $75 \times 10^6$ to $425 \times 10^6$ W/cm²
Spot size in $TEM_{00}$ mode=100 μm,
Current=15 to 24 amperes, preferably from 18 to 24 amperes,
Laser Energy=$6 \times 10^{-4}$ to $5.5 \times 10^{-3}$ J, preferably from $6 \times 10^{-4}$ to $3 \times 10^{-3}$ J,
Energy Density=5 to 65 J/cm², preferably from 7 to 40 J/cm²,
Pulse rate=0.5 to 50 kHz, preferably from 1 to 30 kHz,
Pulse width=50 to 300 nsec, preferably from 80 to 150 nsec
Scan field=11.5×11.5 cm,
Scan velocity=3 m/sec (maximum), and
Repeatability in pulse to pulse jitter=~25% at high Q-switch rate (~30 kHz)
   <10% at low Q-switch rate (~1 kHz).

For imaging by means of "melting", essentially the laser set up conditions are basically the same as that of ablation conditions noted above, however whether the laser will operate in the ablation mode or in the melting mode will be determined by the dot frequency in a given scan area. It is also characterized by very low Q-switch rate (<1 kHz) slow writing speed (scan velocity of 30 to 1000 mm/sec) and wide pulse width (50 to 300 msec).

The laser images can be easily erased from the zirconia alloy or its composite with alumina surfaces. The image is erased by either heating the surface in air or oxygen at an elevated temperature (temperatures of from about 150° to about 250° C. for zirconia alloy and from about 300° to 500° C. for zirconia-alumina composite for a period of about 5 to about 60 minutes are generally suitable with a temperature of about 200° C. and 400° C. respectively for a period of about 10 minutes being preferred) or by treating the surface with a $CO_2$ laser operating in accordance with the following parameters:

Wavelength: 10600 nm
Peak Power: 300 watts (operated at 20% duty cycle)
Average Power: 70 watts
Beam Size: 500 $\mu$m with the beam width being pulse modulated.

In addition to its use as a means for erasing the image, a $CO_2$ laser can be employed as a means of carrying out the imagewise exposure in the process employing an substoichiometric to stoichiometric conversion.

Only the printing surface of the zirconia alloy ceramic is altered in the image-forming process. However, the image formed is a permanent image which can only be removed by means such as the thermally-activated or laser-assisted oxidation described herein. Therefore, the erased print surface can be imaged repeatedly by using the process described above. The present invention is therefore useable in rewriting processes.

In the examples provided below, the images of bar-cods were created or captured electronically with a digital flat bed scanner or a Kodak Photo CD. The captured images were converted to the appropriate dot density, in the range of from about 80 to about 250 dots/cm. These images were then reduced to two colors by dithering to half tones. A raster to vector conversion operation was then executed on the half-toned images. The converted vector files in the form of plot files were saved and were laser scanned onto the ceramic surface. The marking system accepts only vector coordinate instructions and these instructions are fed in the form of a plot file. The plot files are loaded directly into the scanner drive electronics. The electronically stored photographic images can be converted to a vector format using a number of commercially available software packages such as COREL DRIVE or ENVISION-IT by Envision Solutions Technology.

The invention is further illustrated by the following examples of its practice, which are not to be interpreted as limiting the invention in any way.

EXAMPLE 1

Several off-white colored zirconia-yttria ceramic and its composites with alumina planar members were irradiated by a Nd:YAG laser so that at least a portion of the printing surface area turns black. The Nd:YAG laser was Q-switched and optically pumped with a krypton arc lamp. The spot size or beam diameter was approximately 100 $\mu$m in TEM (low order mode). The spot size can be increased to 300 $\mu$m in MM (multimode) using a 163 mm focusing lens. The beam diameter can also be made as small as 5 $\mu$m by using appropriate lenses.

The optical density of the black surface depended on the laser energy and the scan speed. The printing member is very durable, having great wear-and abrasion-resistance, so that it can be used over and over again. The image is stable unless exposed to high heat, such as 200° C. (for zirconia alloy) or 400° C. (for composites) heat, or high energy infrared radiation such as that from a $CO_2$ laser. The printing member was used more than once because the image is erasable without disturbing the ceramic surface.

EXAMPLE 2

In printing bar-codes on a printing surface of the substrate, the printing surface was of substoichiometric composition and black in color. It was imaged using an argon gas laser. The formed bar-codes were white on a black background. A carbon dioxide gas laser also can provide the same effect. Images of bar-codes formed in this manner are white lines or bars on a black background.

EXAMPLE 3

As discussed earlier, the printing members suitable for bar-code printing were prepared from highly dense zirconia alloy ceramics or from its composites with alumina in a planar form using one of the following manufacturing processes:

a) dry pressing to the desired or near-desired shape;

b) cold isostatic pressing and green machining;

c) injection molding and de-binding; and d) tape casting.

After each of these processes, the articles (printing members) were then subjected to high temperature (about 1500° C.) sintering and final machining to the desired dimensions, if required.

These printing members were imaged as described above in Example 1 by using Nd:YAG laser and the images of bar-codes formed in this manner were black lines or bars on a white background.

EXAMPLE 4

The black background of Example 2 and the black bar-codes of Example 3 were erased (i.e., converted to stoichiometric in composition) by heating the printing member at 200° C. and 400° C. for 10 minutes for zirconia alloy and zirconia alloy composite, respectively.

The invention has been described in detail with particular reference to certain preferred embodiments thereof, but it will be understood that variations and modifications can be effected within the spirit and scope of the invention.

PARTS LIST

| | |
|---|---|
| 10 | planar printing member |
| 20 | outer printing surface |
| 30 | substrate |
| 40 | insert cavity |
| 43 | one-dimensional bar-code |
| 44 | one-dimensional bar-code |
| 50 | insert member |
| 60 | planar writing surface |
| 70 | two-dimensional bar-code |

What is claimed is:

1. A method of making a printing member for providing an erasable bar-code, comprising the steps of:

a) providing a polymeric substrate having an insert cavity;

b) forming an insert member having a writing surface composed of a non-porous zirconia ceramic $ZrO_2$ that is alloyed with a secondary oxide selected from the group consisting of MgO, CaO, $Y_2O_3$, $Sc_2O_3$, a rare earth oxide, and combinations thereof, the non-porous zirconia alloy ceramic having a density of from about 5.6 to about 6.2 $g/cm^3$; and c) providing an erasable bar-code image on the printing member by imagewise exposing the printing surface to electromagnetic radiation that transforms the printing surface from a stoichiometric to a substoichiometric state, thereby creating a printing surface having both image areas and non-image areas.

2. The method of claim 1 further including the steps of:

d) erasing the bar-code image on the printing surface and forming another bar-code image on such surface.

3. The method of claim 2 wherein the bar-code image is two dimensional.

4. The method of claim 1 wherein the erasable bar-code image is provided by exposing the printing surface to a Nd:YAG laser beam so that the bar-code is black on a white background.

5. The method of claim 1 wherein the black bar-code is erased by heating the printing surface to a temperature in a range of 200° C. to 400° C. for a time sufficient to erase the black bar-code.

6. The method of claim 1 wherein the black bar-code is erased by subjecting the printing surface to a $CO_2$ laser beam.

7. The method of claim 1 wherein at least a portion of the printing surface is exposed to a Nd:YAG laser beam so that at least a portion of the printing surface is black in color and then exposing the blackened surface portion to an argon laser beam to print white bar-codes on a black background.

8. The method of claim 1 wherein at least a portion of the printing surface is exposed to a Nd:YAG laser beam so that at least a portion of the printing surface is black in color and then exposing the blackened surface portion to a carbon dioxide laser beam to print white bar-codes on a black background.

9. The method of claim 1 wherein the bar-codes are formed by exposing the printing surface to a laser beam which ablates or melts material from the printing surface.

10. A method of writing and rewriting bar-codes on a printing member comprising the steps of:

a) providing a polymeric substrate having an insert cavity;

b) forming an insert member having a writing surface composed of a non-porous zirconia ceramic $ZrO_2$ that is alloyed with a secondary oxide selected from the group consisting of MgO, CaO, $Y_2O_3$, $Sc_2O_3$, a rare earth oxide, and combinations thereof, the non-porous zirconia alloy ceramic having a density of from about 5.6 to about 6.2 $g/cm^3$;

c) providing an erasable bar-code image on the printing member by imagewise exposing the printing surface to electromagnetic radiation that transforms the printing surface from a stoichiometric to a substoichiometric state, thereby creating a printing surface having both image areas and non-image areas; and d) erasing the bar-code and rewriting a different erasable bar-code on the surface of the printing member.

* * * * *